UNITED STATES PATENT OFFICE.

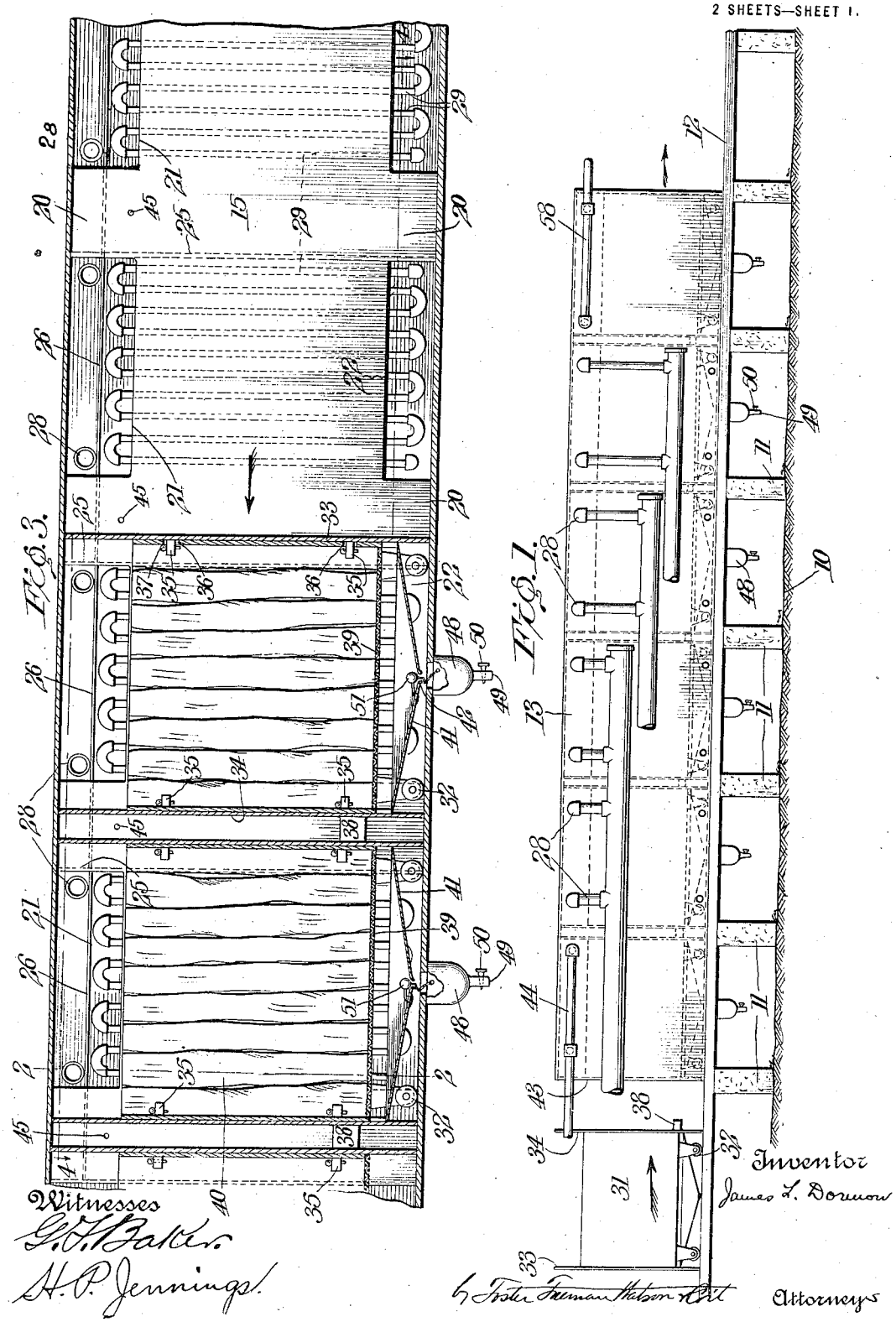

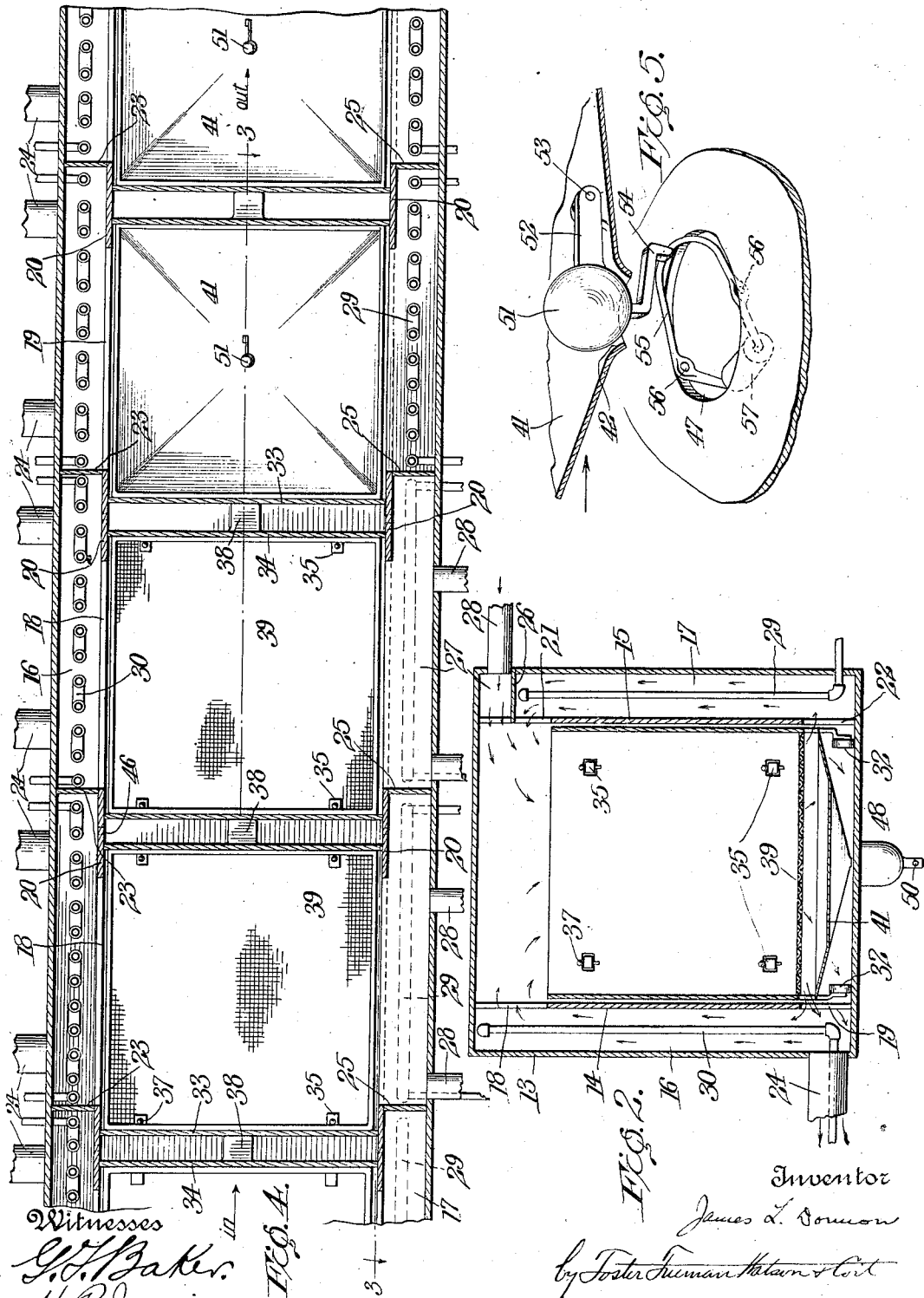

JAMES L. DORMON, OF NEW ORLEANS, LOUISIANA.

PROCESS AND APPARATUS FOR DESTRUCTIVE DISTILLATION OF WOOD.

1,179,616.

Specification of Letters Patent.

Patented Apr. 18, 1916.

Application filed April 30, 1915. Serial No. 24,977.

*To all whom it may concern:*

Be it known that I, JAMES L. DORMON, a citizen of the United States, and resident of New Orleans, parish of Orleans, State of Louisiana, have invented certain new and useful Improvements in Processes and Apparatus for Destructive Distillation of Wood, of which the following is a specification.

My invention relates to a process and apparatus for extracting from wood or other carbonaceous materials the volatile and fusible constituents thereof.

The invention is particularly adapted for extracting turpentine, wood spirits, rosin, tar, pitch, etc., from pine wood.

One of the objects of the invention is to provide an improved process and apparatus for the above stated purpose so that the distillation may be carried on continuously with the maximum efficiency, both in the application of the heat to the materials and in the quality of the products derived from the materials.

The invention is an improvement in the process and apparatus disclosed in my Patent No. 1,122,084, granted December 22, 1914. In accordance with the process disclosed in my said patent the carbonaceous material is placed in a suitable basket or container and a heated gas, which is inert to the material, is passed through the material and carries off the volatile products, the products derived at the different temperatures being led off separately and condensed separately. The temperature of the heating gas is raised by steps and the materials are first subjected to a temperature which is suitable for driving off the water and turpentine, this temperature being approximately 149° C. After all of the turpentine has been extracted, the temperature of the gas is raised and other products are taken off. This process is continued until all of the volatile and fusible products are driven off and only the charcoal remains.

In accordance with my improved process the container with the materials therein is moved through an elongated chamber by intermittent steps and at the different steps the materials have passed therethrough inert gases of varying temperatures. Several containers for the materials are used and each is subjected to a different temperature so that when the process has continued for a sufficient length of time the containers are moved and each is subjected to the next higher temperature, thus resulting in a progressive heating of the materials and a continuous process.

In addition to supplying fresh gases to each section of the apparatus, provision is made for recirculating and reheating a portion of the gases in each section so that the quantity of fresh gas required, in order to supply the necessary amount of heat to complete the distillation in the desired time, is reduced, and the gases discharged from each section are more nearly saturated with the volatile products of the wood, this permitting the use of smaller condensing apparatus for extracting the products from the inert gases.

One form of apparatus for carrying out my invention is illustrated in the accompanying drawings in which—

Figure 1 is a side elevation; Fig. 2 is a transverse section on the line 2—2 of Fig. 3. Fig. 3 is a vertical longitudinal section on the line 3—3 of Fig. 4; Fig. 4 is a section on a horizontal plane on the line 4—4 of Fig. 3; Fig. 5 is a perspective view of a detail of the apparatus.

Referring to the drawings 10 indicates the surface of the ground and 11 a series of piers on which there is supported a suitable bed 12. An elongated rectangular heating chamber 13 is arranged on the bed 12 and may be constructed of sheet metal or sheet metal and suitable insulating material to prevent the loss of heat, but it will be understood that the structure of the chamber 13 is not limited to any particular material.

Arranged within the chamber 13 and preferably on both sides and extending throughout the length of the chamber are partitions 14 and 15. These partitions are spaced from the side walls of the chamber to provide passages 16 and 17 and the partition 14 has openings 18 and 19 at the top and bottom thereof respectively. These openings extend longitudinally of the partition plates and are separated by portions 20 of the partitions which extend to the top and bottom walls of the chamber as clearly shown in Figs. 2 and 3. The partition 15 is similarly provided with openings 21 and 22 at the top and bottom thereof, respectively, and these openings are also separated by the portions 20 which extend to the top and bottom walls of the chamber. Vertical partitions 23 extend across the passage 16 in line with the portions 20 of the partition 14 and separate the passage 16 into separate spaces with which the exit pipes 24 communicate, (see Fig. 4).

Vertical partitions 25 extend across the passage 17 and divide this passage into separate spaces which are preferably arranged directly opposite the spaces which are formed by the partitions 23. Horizontal partitions 26 are arranged in the upper part of the spaces between the partitions 25 and the side wall and form supply chambers 27 for the hot gases, the gases being supplied to these chambers by the inlet pipes 28. From Fig. 2 it will be seen that the partition 26 divides the opening 21 into upper and lower parts, the upper part of the opening serving as an exit for the chamber 27 and the lower part an exit for the rising gases in the space 17 between the partition 15 and the side wall.

Arranged in each of the spaces between the partitions 25 is a heating device of any suitable type, such as the coil 29 through which a suitable fluid of the desired temperature is circulated. Each of the coils 29 is independent and preferably supplied from a separate source so as to permit the requisite temperature to be maintained in each of the sections of the heating chamber. The spaces between the partitions 23 are also provided with heating devices, shown as the coils 30, and these coils are for the same purpose as the coils 29.

Suitable receptacles 31, for the material to be distilled, are provided and each of these receptacles has wheels or other devices 32 by means of which they are supported on the floor of the chamber 13 and may be conveniently moved through the chamber from one end to the other. The receptacles 31 thus constitute cars and each of these cars is preferably provided at its opposite ends with plates 33 and 34 which are loosely attached to the car and fit the interior of the heating chamber between the partitions 14 and 15 and the top and bottom walls of the chamber so that when a car is in the chamber it divides the space between the partitions 15 and 16 into sections, the plates 33 and 34 acting as pistons or division plates, for this purpose, and in order to more effectively seal the joints at the edges of the plates 33 and 34, they may be provided with any suitable form of packing means, not shown. The plates 33 and 34 have lugs 35 secured thereto, these lugs passing through openings 36 in the end walls of the cars 31 and being secured on the inner side of said walls by suitable pins 37. From Fig. 3 it will be seen that the openings 36 are larger than the pins 35 and thus permit the pins to have a certain amount of freedom therein so that the plates 33 and 34 may readily adjust themselves to any unevenness in the chamber. The plates 34 may be provided with bumpers 38, these bumpers spacing the plates on successive cars a certain distance apart so as to provide a dead space which acts as an insulator between the cars and through which space gases may be passed in the manner hereinafter described, to form a better insulation. It will be understood that the spacing of the plates 33 and 34 on successive cars, is merely one expedient for insulating one car from the other and that any other suitable insulating device may be employed for this purpose.

Each of the cars is provided with a foraminous or screen bottom 39 which supports the wood or other carbonaceous material, indicated at 40, in Fig. 3. Below the screen 39, each car carries one or more dished collecting pans 41 which receive the rosin or other fusible constituents derived from the wood. The rosin and other fusible constituents trickle down the pieces of wood and drip through the screen 39 into the collecting pans 41 and drain to the center outlet 42 which is provided in each of the pans.

In the operation of the apparatus the cars 31, filled with the material to be distilled, are passed into the end 43 of the heating chamber, and this end may be provided with a suitable closure or the plate 33 at the rear end of the car may serve as a closure, if desired. The plate 34 at the forward end of the car is arranged opposite portions 20 of the partitions 14 and 15 so as to effectively close the space occupied by the car from the space in front. In the first section of the heating chamber, into which the car 31 is received, steam or other gaseous medium, which is inert to the material being distilled, is blown through to drive out the air, this medium being supplied through the pipe 44. The car is immediately run ahead to the next section of the chamber and in this section steam or other heating medium, inert to the material being distilled, is passed through the material to drive off the water and spirits of turpentine, and when these are driven from the material another car is pushed into the heating chamber and moves the first car ahead to the third section or step in the chamber. The three cars thus divide the chamber into entirely separate sections so that the material in the first car may be subjected to a heating gas of a higher temperature than that to which the following car is subjected. As shown in Figs. 3 and 4, the plates 33 and 34, on successive cars, are both arranged opposite the portions 20 of the partitions 14 and 15 and thus coöperate with the partitions and with the top and bottom walls of the chamber to form a dead space between the cars. In order to circulate a gas through this dead space, to carry off any heat which may be received from the hotter section ahead, there is provided in the partition 15 openings 45 through which the gas supplied to the cooler chamber is supplied to the dead space. The gas supplied to the dead space between the plates 33 and 34 is discharged adjacent the bottom of the plate 14 through openings 46. From Fig. 4 it will be seen that the partitions 23 and 25 are so arranged relatively to the positions occupied by the cars in the heating chamber, that the hotter heating medium will have practically no effect on the material in the car in the section of the heating chamber immediately to the rear.

The gases received from the chambers 27 pass downwardly through the mass of materials in the cars and then through the openings 19 and 22 in the partitions 14 and 15 to the spaces between these partitions and the side walls of the chamber. From Fig. 2 it will be evident that a portion of the gases will pass out through the exit pipes 24, but a portion of the gases will rise in the spaces 16 and 17, due to the heating effect of the coils 29 and 30, and pass through the openings 18 and 21 to the space above the car; whence they mingle with the fresh gases from the chamber 27 and pass downwardly again through the material being distilled. In this way a portion of the gases are recirculated and reheated and it is unnecessary to supply so large a quantity of gases, through the pipes 28, as would be necessary if a portion of the gases were not recirculated and reheated. The recirculation of the gases also has the effect of more fully saturating them with the volatile products of the material being distilled so that, in order to carry off a given quantity of these products, a smaller volume of gas is necessary than if the gas is passed out in a less saturated condition. The gases pass from the exit pipes 24 to any suitable form of condensing apparatus, in which the gases from the different sections of the heating chamber are separately condensed, such apparatus being well known and a description and illustration of the same being unnecessary.

The rosin and other fusible materials, which are received in the pans 41, in the different sections of the heating chamber, drain through the openings 42 and through openings 47 in the bottom wall of floor, of the heating chamber, which are in alinement therewith. The openings 47 are so placed that there will be one under each of the cars in the positions in which the cars are stopped during their progress from one end of the heating chamber to the other. Below the floor of the heating chamber there are receptacles 48 which receive the fusible products from the openings 47 and these products may drain from the receptacles 48 through the outlets 49 therefrom, these outlets being controlled by suitable valves 50 which are adapted to normally close the receptacles and prevent the escape of gases and also prevent any inrush of air.

While the cars are moving from one position, in the heating chamber, to the next position, it is necessary to have the outlets 42 closed in order to prevent the rosin or other fusible material from dripping along the bottom of the heating chamber and eventually forming a crust thereon. In order to close the outlets 42 I have provided a ball valve 51 which has an arm 52 mounted on a fixed pivot 53 and permitting the valve to move to and from a position to close the outlet. An arm 54 projects through the outlet 42 from the lower side of the ball 51 and when the outlet 42 is over the opening 47 the arm 54 is in engagement with a suitable tripping device or bail 55 which holds the valve 51 in the open position. The bail 55 is shown as a U-shaped structure which is pivoted, at 56, below the upper surface of the floor of the heating chamber and provided with a counterweight 57 which normally projects the bail above the floor so that, as the car comes to a stop, on being moved from one position in the heating chamber to the next, the arm 54 engages the bail 55 and automatically opens the valve 51. By having the bail pivoted below the upper surface of the floor of the heating chamber the plates 33 and 34, which scrape along the floor, will depress the bail, the motion of the car being in the direction of the arrow shown in Fig. 5. When the cars start to move to the next position in the heating chamber the arm 54 is disengaged from the bail 55 and permits the valve 51 to close.

The cars move, in the manner above described, from one stage to the next in the heating chamber and it will be readily understood that as many stages may be provided as may be necessary to properly distil any particular material to separately derive the desired products therefrom. It will also be understood that each section of the heating chamber may have a plurality of cars therein so that the material in all of these cars will be simultaneously subjected to gases of the same temperature. As shown in the drawings, it is contemplated to push the cars through the heating chamber from the entrance end and it will be understood that the car at the discharge end of the chamber may act as a closure for said end.

When the cars reach the last section of the heating chamber, the contents have been reduced to charcoal and, in order to obviate the danger of fire or explosion when the car emerges into the open atmosphere, a suitable cooling medium is blown through, this medium being supplied by a pipe 58.

While I have illustrated what is now considered to be the preferred form of apparatus it will be understood that various changes may be made in the details of construction without departing from the spirit and scope of the invention as defined in the appended claims.

Having thus described my invention what I claim is:

1. The method of distilling wood and other carbonaceous materials which consists in passing through a chamber containing the material, to be distilled, a heated gas which is inert to the material, withdrawing a portion of the gases from the chamber to extract the products carried off from the material, and recirculating the remainder of the gases through the material without withdrawing them from the chamber.

2. The method of distilling wood and other carbonaceous materials which consists in passing through a chamber containing the material, to be distilled, a heated gas which is inert to the material, withdrawing a portion of the gases from the chamber to extract the products carried off from the material, and recirculating in the chamber the remainder of the gases, which have passed through the material, and reheating the same in the chamber out of contact with the material being distilled.

3. The method of distilling wood and other carbonaceous materials which consists in intermittently moving the material through an elongated chamber, passing through the material at different points in said chamber gases which are inert to the material and of different temperatures and separately withdrawing the gases of different temperatures from the chamber to extract the products carried off from the material.

4. The method of distilling wood and other carbonaceous materials which consists in passing the material through an elongated chamber by intermittent steps, passing through the material in different sections of the chamber gases of different temperatures, withdrawing a part of the gases from each section of said chamber to extract the products carried off from the material and recirculating the remainder of the gases in each section of the chamber.

5. The method of distilling wood and other carbonaceous materials which consists in passing the material through an elongated chamber by intermittent steps, passing through the material, at each step in its progress through the chamber, heated gases which are inert to the material, the gases at the different steps being at progressively higher temperatures, withdrawing a portion of the gases at each step to extract the products carried off from the material and re-circulating and re-heating the remainder of the gases at each step.

6. In apparatus of the class described, the combination of a closed structure forming a heating chamber, a partition at one side of said chamber, a carrier for the material to be distilled, said partition having openings therein permitting a recirculation of gases from one side of the carrier to the other, means for supplying a heated gas to said chamber, and means for withdrawing the gas from the chamber.

7. In apparatus of the class described, the combination of a closed structure forming a heating chamber, a partition arranged in said chamber and spaced from an outer wall thereof to form a passage for gases, a carrier for the material, said partition having openings therein whereby gases are adapted to flow from one side of said carrier through said passage to the opposite side of the carrier, heating means arranged in said passage, means for supplying a heated gas to said chamber, and means for withdrawing gases from said chamber.

8. In apparatus of the class described the combination of a closed structure forming a heating chamber, a vertically arranged partition in said chamber, spaced from the wall thereof to form a passage and provided with openings at the top and bottom of said passage, a carrier for the material, heating means arranged in said passage, means for supplying a heated gas to said chamber, and means for withdrawing gas from the chamber.

9. In apparatus of the class described, the combination of a closed structure forming a heating chamber, a partition arranged in said chamber and spaced from one of the walls thereof, means for supplying a heating gas to the upper part of said chamber adjacent to said partition, means for withdrawing gas from said chamber at the bottom of the side thereof opposite said partition, and a carrier for the material, provided with a foraminous bottom, said partition having openings therein above and below said carrier whereby gases may be circulated from below the carrier through the space between said partition and the side wall, to the space above the carrier.

10. In apparatus of the class described the combination of a closed structure forming a heating chamber, means for supplying gas to said chamber at a point adjacent the top of one of the side walls, a partition spaced from said side walls and provided with openings at its top and bottom, means for withdrawing gas from said chamber at the bottom of the side opposite said partition, a carrier for the material provided with a foraminous bottom, the material in the carrier being substantially above the lower opening and substantially below the upper opening in said partition, and heating means arranged in the space between said partition and the adjacent side wall.

11. In apparatus of the class described, the combination of an elongated closed structure forming a heating chamber, a partition dividing said chamber longitudinally into separate spaces, cross partitions extending from one of the side walls to said longitudinal partition, said longitudinal partition having spaced openings therein between said cross partitions, supply pipes for heating gases connected with each of the spaces formed by the cross partitions, exit pipes for the gases, arranged opposite said supply pipes, and carriers, for the material to be distilled, having a partition at one end thereof adapted to divide the longitudinal chamber in which the car moves into separate spaces.

12. In apparatus of the class described, the combination of an elongated horizontally arranged closed structure forming a heating chamber, longitudinally extending partitions in said chamber spaced from the side walls thereof and provided at intervals throughout their length with openings adjacent the top and bottom walls of the chamber, means for supplying a heating gas to the upper part of the central space in said chamber, means for withdrawing the gas from the lower part of said central space, heating means arranged in the spaces between said partitions and the side walls and carriers, for the material to be distilled, provided with partitions adapted to divide the central space of the heating chamber into separate sections.

13. In apparatus of the class described, the combination of an elongated horizontally arranged closed structure forming a heating chamber, partitions extending longitudinally of said chamber and spaced from the side walls thereof, said partitions being provided at intervals throughout their length with vertically spaced openings, cross partitions between the side walls and said longitudinal partitions and dividing the spaces between the longitudinal partitions and the side walls into separate compartments each of which communicates with the central space in the chamber by said upper and lower openings, heating means arranged in each of said compartments, means for supplying a heating gas to said central space,
means for withdrawing the gas from said central space, and carriers, for the material to be distilled, provided with means for dividing said central space into separate sections each of which communicates with two of said compartments arranged on opposite sides of said central space.

14. In apparatus of the class described, the combination of a horizontally arranged elongated heating chamber, means for supplying a heating gas to said chamber, means for withdrawing the gas from the chamber, and carriers, for the material to be distilled, having partitions dividing the chamber into separate sections, each of said carriers having a foraminous bottom and a collecting pan below said bottom.

15. In apparatus of the class described, the combination of an elongated horizontally arranged heating chamber, having a series of receptacles below the bottom thereof and in open communication with the chamber, means for heating said chamber, and carriers, for the material to be distilled, having foraminous bottoms, collecting pans on said carriers below said bottoms, valve controlled outlets from said pans, and means associated with said receptacles for opening the valves of said outlets when the outlets are over said receptacles.

16. In apparatus of the class described, the combination of an elongated horizontally aranged heating chamber, means for heating said chamber, carriers, for the material to be distilled, having foraminous bottoms, collecting pans aranged below said bottoms and provided with discharge openings, the bottom wall of said heating chamber being provided with openings registering with the openings in said pans, valves for controlling said pan openings, and means for automatically opening said valves when the pan openings are in registration with the openings in the bottom of the chamber.

17. In apparatus of the class described, the combination of an elongated horizontally arranged heating chamber, means for heating said chamber, carriers for the material to be distilled, provided with foraminous bottoms, collecting pans below said bottoms, said pans having discharge openings therein, valves for controlling each of said discharge openings, the bottom wall of said chamber being provided with openings for the material discharged from said pans, and means on the bottom wall of said chamber adapted to automatically open said valves when said discharge openings are in registration with the openings in said bottom wall.

18. In apparatus of the class described, the combination of an elongated horizontally arranged heating chamber, means for heating said chamber, cars, for the material to be distilled, adapted to be run through said chamber, said cars being provided with partitions loosely mounted thereon and dividing said chamber into separate compartments, said partitions fitting the walls of the chamber and having lateral movement independently of the cars.

19. In apparatus of the class described, the combination of an elongated horizontally arranged heating chamber, means for heating said chamber, and cars, for the material to be distilled, having a partition secured to each end thereof, said partitions dividing said chamber into separate compartments so that the material in one car may be subjected to a different temperature from that to which the material in the adjoining car is subjected, means for spacing the partitions on adjoining cars, and means whereby gas may be circulated through the spaces between the partitions on adjacent cars.

20. In apparatus of the class described, the combination of an elongated horizontally arranged heating chamber, and cars, for the material to be distilled, having partitions fitting the walls of the chamber and dividing the chamber into separate compartments so that the material in each car may be subjected to a different temperature from that to which the material in adjoining cars is subjected, the said partitions forming insulating spaces between adjoining cars, and means for circulating gas through said insulating spaces.

In testimony whereof I affix my signature.

JAMES L. DORMON.